Sept. 5, 1961          T. H. MURPHY          2,998,617
CASTER
Filed Dec. 16, 1957
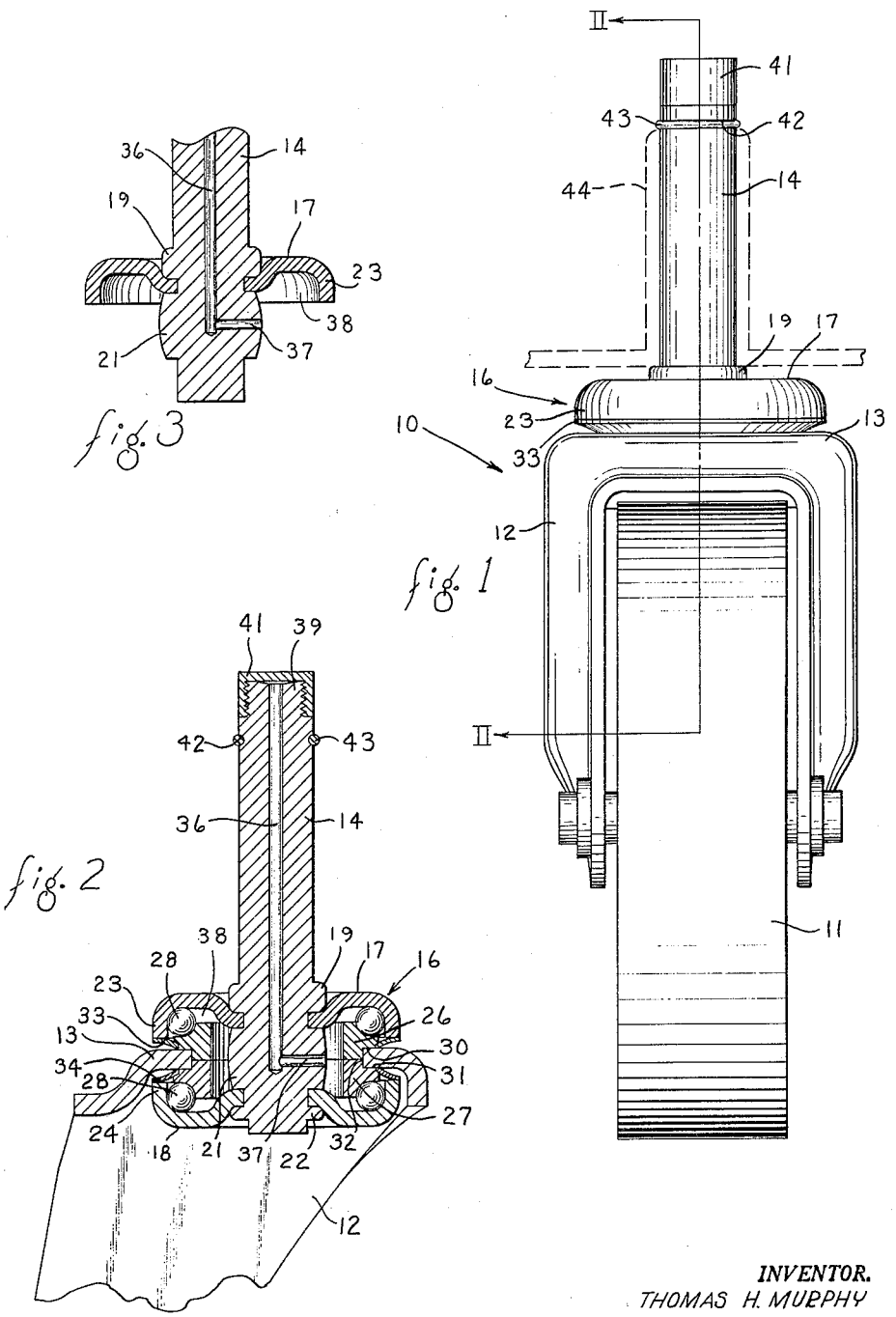
INVENTOR.
THOMAS H. MURPHY
BY
Woodhams, Blanchard and Flynn
ATTORNEYS

United States Patent Office 2,998,617
Patented Sept. 5, 1961

2,998,617
CASTER
Thomas H. Murphy, Kalamazoo Township, Kalamazoo County, Mich., assignor to Pemco Wheel Company, Kalamazoo, Mich., a corporation of Michigan
Filed Dec. 16, 1957, Ser. No. 702,926
1 Claim. (Cl. 16—21)

This invention relates in general to a swivel caster and, more particularly, to a type thereof having a swivel bearing assembly defining a closed chamber and lubrication structure for directing lubricant into said chamber.

While the structure comprising the invention is applicable in a wide variety of circumstances, the particular need giving immediate rise to the invention has developed in the use of swivel casters for shopping carriers and, accordingly, the description of the invention will proceed in terms of such use. However, it will be recognized that this will be only illustrative and not limiting.

In the use of swivel casters for shopping carriers, it has long been recognized that the lubrication problem was treated inadequately. For example, in many cases the casters have in the past been supplied with lubricant at the factory but with no provision made for introducing further lubricant into the swivel assembly. Hence the swivel mechanism of the shopping carrier would eventually become stiff and the carrier would fail to operate as smoothly as is desirable in a high grade store to maintain good customer relations. Some attempts have been made to solve this problem by placing an opening in the underside of the bearing enclosure for the introduction of further grease thereinto (the upperside being normally inaccessible). This has been reasonably satisfactory from the standpoint of permitting replacement or renewal of the lubricant within the bearing enclosure, of a given shopping carrier, but it has required the inverting of the given shopping carrier in order to apply the lubricant thereto. While the inverting of any one shopping carrier is a minor task, where there are involved large numbers of shopping carriers, as in the usual super market, the inconvenience of inverting each carrier for the application of lubricant to the swivel bearing thereof has been such that the work was either done very inefficiently, sometimes only spasmodically, and often not at all.

A further problem has arisen from the underneath location of previous access means provided for introducing lubricant into the bearing enclosure of the swivel portion of the swivel caster. Such location of the access opening, entirely aside from the necessity of inverting the shopping carrier in order to reach it, has been undesriable due to the occasional tendency of lubricant to drop out of the access opening onto the floor or due to the tendency of dust and dirt to gather in such access opening. This latter is particularly prevalent where the caster is being used on a shopping carrier which is in turn being used on a relatively dusty floor, particularly where such dust or dirt is being continuously agitated as in the usual super market.

On the other hand, shopping carriers of all types, and including the swivel casters forming a part thereof, are an extremely competitive item and it has accordingly been impossible from the standpoint of expense to provide conventional lubricating devices on the swivel mechanism of the caster.

Accordingly, it has for a long time been desirable to provide a swivel caster with means for introducing lubrication into the swivel bearing mechanism, which means are readily accessible without inverting or otherwise changing the position of the shopping carrier from its normal position of use, and without involving appreciable additional expense.

The foregoing reference to the use of such casters on shopping carriers will sufficiently illustrate the maintenance problem involved in the present form of caster construction. Other uses of such casters will be readily recognized by those skilled in the art, such as use with surgical operating tables with respect to which it is highly desirable to improve the ease of lubricating the swivel portion of the caster as well as to eliminate the access opening from the underside of the bearing enclosure.

Thus, a primary object of this invention is to overcome a long standing and demonstrated need for a lubrication structure in a swivel bearing assembly, whereby the swivel bearing can be lubricated without tipping or inverting the equipment with which the swivel caster is being used.

A further object of this invention is the provision of a lubrication structure, as aforesaid, including a passageway which extends downwardly through the swivel post of the swivel caster and is, therefore, readily accessible at the upper end of the caster.

A further object of this invention is the provision of a lubrication structure, as aforesaid, which is extremely simple in form and use, and which can be adapted to existing swivel bearing constructions.

A further object of this invention is the provision of a lubrication structure for a swivel bearing caster, as aforesaid, which can, if desired, be easily arranged to positively prevent the introduction of dust or dirt particles into the bearing enclosure.

Other objects and purposes of this invention will become apparent to persons familiar with this type of equipment upon reading the following specification and examining the accompanying drawings in which:

FIGURE 1 is a front elevational view of a swivel caster embodying the invention.

FIGURE 2 is a sectional view taken along the line II—II of FIGURE 1.

FIGURE 3 is a fragment of FIGURE 2 showing the swivel structure in a partially assembled condition.

For the purpose of convenience, the terms "upper," "lower," and derivatives thereof will have reference to a swivel caster embodying the invention when appearing in its normal position of use, as shown in FIGURES 1 and 2. The terms "inner," "outer" and derivatives thereof will have reference to the geometric center of the swivel bearing structure in said caster and parts associated therewith.

*General description*

In order to meet the objects of this invention, including those set forth above, there has been provided a swivel caster construction comprising a wheel supporting yoke, a swivel post, and an enclosed swivel bearing assembly mounted upon said post and supporting said yoke rotatably with respect to the swivel post. The swivel post is provided with a lengthwise passageway which extends through the upper end of said post to and through the side wall of said post into the enclosure housing the swivel bearing.

*Detailed construction*

The swivel caster 10 (FIGURE 1) is a typical structure with which the invention may be utilized and it has accordingly been selected to illustrate the invention. However, the invention is applicable to many other swivel caster structures of both sealed and unsealed type and the selection of one particular bearing structure to illustrate the invention will not be taken as limiting.

The particular bearing structure chosen to illustrate the invention may be the swivel caster disclosed in the copending patent application Serial No. 678,287 filed August 15, 1957, and assigned to the assignee of this application. Briefly, such swivel caster 10 is comprised of a caster wheel 11 rotatably supported upon and within a wheel yoke 12 having a mounting plate 13 at its upper end. The yoke 12 is rotatably supported upon the swivel post 14 by means of the swivel bearing assembly 16, which is secured to the lower end of said post 14 and rotatably supports the mounting plate 13.

In more detail, the swivel assembly 16 (FIGURE 2) includes upper and lower annular bearing ball retainers 17 and 18, which are preferably substantially identical. Said ball retainers have circular, coaxial openings through which the lower end of the post 14 is slidably receivable. Said post 14 has an annular external flange 19 spaced from the lower end thereof and against which the upper ball retainer 17 is disposed. The lower portion of the post 14 is then compressed, as by means of a forging operation, to provide an annular enlargement 21, as shown in FIGURE 3, for snugly holding said upper ball retainer 17 against the annular flange 19. The lower ball retainer 18 is sleeved upon the lower end of the post 14 against the annular enlargement 21 after certain bearing parts described hereinafter are properly placed between said ball retainers. Then, the extreme lower end of the said post 14 is upset, as by a forging operation, to provide the annular ridge 22 which holds the lower ball retainer 18 snugly against the annular enlargement 21.

The ball retainers 17 and 18 have peripheral flanges 23 and 24, respectively, which extend toward each other. A pair of adjacent thrust rings 26 and 27 encircle, and are spaced radially outwardly from, the annular enlargement 21 and are spaced radially inwardly from the peripheral flanges 23 and 24, respectively. A plurality of bearing balls 28 are disposed between the respective ball retainers 17 and 18 and thrust rings 26 and 27.

The thrust rings 26 and 27 have adjacent annular notches 30 and 31, which cooperate to provide a circumferential groove in which the wall of the central opening 32 in the mounting plate 13 is snugly receivable. Annular sealing rings 33 and 34 in this embodiment extend between the peripheral flanges 23 and 24 and the thrust rings 26 and 27, respectively, to complete the sealed enclosure for the bearing balls 28 but may be omitted if desired.

The swivel post 14 has a lengthwise, preferably coaxial, passageway 36 which extends from a point preferably disposed approximately midway between the bearing ball retainers 17 and 18 through the upper end of said post. A radial passageway 37 extends from the lower end of said axial passageway 36 through the side wall of the post 14 and into the lubrication chamber 38. A grease receiving fitting (not shown), as an Alemite fitting, may be provided at the upper end of the passageway 36, if desired.

The axial passageway 36 and radial passageway 37 are preferably provided in the swivel post 14 after the annular enlargement 21 has been formed, whereby the upper ball retainer 17 is affixed upon the swivel post 14, as shown in FIGURE 3. Accordingly, no material distortion is created in either of these passageways during and by the mounting of the lower ball retainer 18 upon the post 14.

The upper end portion 39 of the swivel post 14 may, if desired, be reduced in diameter and be externally threaded to receive an internally threaded dust cap 41 for closing the upper end of the axial passageway 36. Said swivel post 14 may also be provided with an annular recess 42 below said threaded portion 39 for reception of a snap ring 43, which prevents accidental disengagement of the swivel post 14 from within means, such as the sleeve 44 on the equipment supported by said swivel caster 10, through which the post 14 is slidably received.

Accordingly, when it becomes desirable to lubricate the bearing balls 28 and associated bearing surfaces within the lubrication chamber 38, the dust cap 41 (where used) is removed from the upper end of the swivel post 14 and a suitable lubricant, such as oil or grease under pressure, is introduced into the upper end of the axial passageway 36. Such lubricant moves through the axial passageway 36 and the radial passageway 37 into the lubrication chamber 38 where it covers said bearing balls and the bearing surfaces within the bearing enclosure. The dust cap 41, if used, is replaced upon the upper end of the swivel post 14 and the lubrication operation is completed. It will be noted that such lubrication is accomplished without changing the position of the swivel caster or the equipment associated therewith.

Although a particular preferred embodiment of the invention has been disclosed hereinabove for illustrative purposes, it will be understood that variations or modifications of such disclosure, which lie within the scope of the appended claim, are fully contemplated.

In the claim:

In a swivel caster including a wheel and a yoke therefor, the combination comprising: a post having an annular ridge near its lower end; a pair of spaced bearing retainer rings secured to said post near said lower end thereof and on either side of said ridge; said retainer rings having peripheral flanges extending substantially toward each other and having a first pair of bearing surfaces on their opposing faces, annular support means embracing a portion of said yoke, axially aligned with said ridge and spaced radially outwardly therefrom, said annular support means supporting and defining a second pair of bearing surfaces on opposite axial sides thereof, said second surfaces respectively facing said first surfaces; a pair of sets of bearing balls disposed, respectively, between the corresponding and facing surfaces of said first and second pair of surfaces; annular sealing means between said annular support means and at least one of said retainer rings, said sealing means, the retainer rings, the annular support means and the adjacent portion of said post forming an annular, substantially closed, bearing compartment; a first passageway in said post extending from a point near said lower end thereof through the upper end thereof; and a second passageway through said post extending from said first passageway and communicating through said ridge directly with said bearing compartment.

References Cited in the file of this patent

UNITED STATES PATENTS

| 1,282,448 | Malloy | Oct. 22, 1918 |
| 1,734,363 | Chesnutt | Nov. 5, 1929 |
| 1,885,990 | Chesnutt | Nov. 1, 1932 |
| 2,188,648 | Bouvier et al. | Jan. 30, 1940 |
| 2,380,327 | Parsons | July 10, 1945 |
| 2,566,322 | Flowers | Sept. 4, 1951 |

FOREIGN PATENTS

| 1,558 | Great Britain | Aug. 14, 1913 |
| 300,874 | Switzerland | Aug. 31, 1954 |